United States Patent
Yu et al.

(10) Patent No.: US 11,740,538 B2
(45) Date of Patent: Aug. 29, 2023

(54) LENS DRIVING MODULE

(71) Applicant: TDK TAIWAN CORP., Taoyuan (TW)

(72) Inventors: Cheng-Kai Yu, Taoyuan (TW);
Chen-Hsien Fan, Taoyuan (TW);
Chao-Chang Hu, Taoyuan (TW);
Shu-Shan Chen, Taoyuan (TW);
Chih-Wei Weng, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 15 days.

(21) Appl. No.: 17/484,572

(22) Filed: Sep. 24, 2021

(65) Prior Publication Data
US 2022/0011649 A1     Jan. 13, 2022

Related U.S. Application Data

(63) Continuation of application No. 16/814,208, filed on Mar. 10, 2020, now Pat. No. 11,397,370, which is a (Continued)

(30) Foreign Application Priority Data

May 16, 2017   (CN) .......................... 201710343399.7

(51) Int. Cl.
*G03B 13/36*     (2021.01)
*G02B 7/04*      (2021.01)
(Continued)

(52) U.S. Cl.
CPC .............. *G03B 13/36* (2013.01); *G02B 7/04* (2013.01); *G02B 7/08* (2013.01); *G03B 3/02* (2013.01); *G03B 3/10* (2013.01)

(58) Field of Classification Search
CPC . G03B 13/36; G03B 3/02; G03B 3/10; G03B 5/02; G02B 7/04; G02B 7/08
See application file for complete search history.

(56) References Cited

U.S. PATENT DOCUMENTS

| 10,310,290 | B2 | 6/2019 | Yu et al. |
| 2007/0127904 | A1 | 6/2007 | Iwasaki et al. |
| | | (Continued) | |

FOREIGN PATENT DOCUMENTS

| CN | 102955324 A | 3/2013 |
| CN | 103269414 A | 8/2013 |
| | (Continued) | |

OTHER PUBLICATIONS

Office Action and Search Report for corresponding CN Application 202010484850.9 dated Sep. 26, 2021. (pp. 6).
(Continued)

*Primary Examiner* — James C. Jones
(74) *Attorney, Agent, or Firm* — Muncy, Geissler, Olds & Lowe, P.C.

(57) ABSTRACT

A lens driving module includes a base, a frame fixedly connected to the base, and a holder configured to connect an optical lens. The holder is movable relative to the base. The lens driving module also includes a reflecting element configured to reflect light from a light incident direction to a first direction. The first direction is perpendicular to the light incident direction, and the first direction is parallel to an optical axis of the optical lens. The lens driving module further includes a first electromagnetic driving assembly configured to force the holder to move along the first direction relative to the base. The lens driving module has multiple recesses formed on the base and arranged along the first direction. The lens driving module includes multiple the rolling elements disposed on the recesses, and the holder is moved relative to the base via the rolling elements.

8 Claims, 11 Drawing Sheets

Related U.S. Application Data continuation of application No. 16/381,273, filed on Apr. 11, 2019, now Pat. No. 10,627,701, which is a continuation of application No. 15/642,487, filed on Jul. 6, 2017, now Pat. No. 10,303,042.

(60) Provisional application No. 62/361,223, filed on Jul. 12, 2016.

(51) Int. Cl.
*G02B 7/08* (2021.01)
*G03B 3/02* (2021.01)
*G03B 3/10* (2021.01)

(56) References Cited

U.S. PATENT DOCUMENTS

| | | | |
|---|---|---|---|
| 2014/0104486 A1* | 4/2014 | Seol | H04N 5/2254 348/357 |
| 2016/0044250 A1 | 2/2016 | Shabtay et al. | |
| 2018/0024329 A1* | 1/2018 | Goldenberg | H04N 5/23258 359/557 |

FOREIGN PATENT DOCUMENTS

| | | |
|---|---|---|
| CN | 105717725 A | 6/2016 |
| JP | H0162525 U | 4/1989 |
| JP | H08234077 A | 9/1996 |
| JP | 2006243704 A | 9/2006 |
| JP | 2007156062 A | 6/2007 |
| JP | 2011-033900 A | 2/2011 |
| JP | 2012198379 A | 10/2012 |
| JP | 2012230323 A | 11/2012 |
| JP | 2014149497 A | 8/2014 |

OTHER PUBLICATIONS

Office Action dated Feb. 24, 2021 in JP Application No. 2017134659, 3 pages.

Office Action dated Aug. 5, 2019 in CN Application No. 201710343399.7.

Japanese Office Action dated Mar. 14, 2023 for the corresponding Application No. 2022-134243 in Japan and its English Translation; pp. 1-6.

* cited by examiner ial Application No. 62/361,223, filed Jul. 12, 2016,

LENS DRIVING MODULE

CROSS REFERENCE TO RELATED APPLICATIONS

This application is a continuation of application Ser. No. 16/814,208, filed on Mar. 10, 2020, which is a continuation of application Ser. No. 16/381,273, filed on Apr. 11, 2019, which is a continuation of application Ser. No. 15/642,487, filed on Jul. 6, 2017, which claims the benefit of U.S. Provisional Application No. 62/361,223, filed Jul. 12, 2016, and claims priority of China Patent Application No. 201710343399.7, filed May 16, 2017, the entirety of which are incorporated by reference herein.

BACKGROUND

Technical Field

The disclosure relates to a lens driving module, and in particular to a lens driving module with a plurality of electromagnetic driving assemblies at different positions in height.

Description of the Related Art

As technology develops, many electronic devices nowadays (such as tablet computers or smart phones) are equipped with lens modules and have a camera or video function. When the user of an electronic device equipped with a lens module shakes the device, images captured by the camera via the lens module may turn out blurry. Since the requirements for image quality have increased, it has become more and more important to develop a vibration-proof lens module.

BRIEF SUMMARY

Some embodiments of the disclosure provide a lens driving module, including: a reflecting element, a base, a frame, a holder, an optical lens, a first electromagnetic driving assembly, and a second electromagnetic driving assembly. The frame is connected to the base. The holder holds the optical lens and is movably connected to the base. The reflecting element reflects light from the outside along a light incident direction to pass through the optical lens along a first direction, wherein the light incident direction is substantially perpendicular to the first direction. The first and second electromagnetic driving assemblies are configured to force the holder and the optical lens to move relative to the base, wherein the first and second electromagnetic driving assemblies are situated in different positions in the light incident direction.

In an embodiment, the first electromagnetic driving assembly forces the holder and the optical lens to move in the first direction, and the second electromagnetic driving assembly forces the holder and the optical lens to move in a second direction, wherein the first direction is substantially perpendicular to the second direction.

In an embodiment, a distance is formed between the first electromagnetic driving assembly and the second electromagnetic driving assembly in the light incident direction, and the distance is shorter than the diameter of the optical lens.

In an embodiment, the first electromagnetic driving assembly is disposed on the base and the holder, and the second electromagnetic driving assembly is disposed on the frame and the holder.

In an embodiment, the first electromagnetic driving assembly has a first drive coil, and the second electromagnetic driving assembly has a second drive coil, and wherein the first drive coil and the second drive coil have elongated structures extending in the second direction and the first direction respectively, and the first direction is substantially perpendicular to the second direction.

In an embodiment, the optical lens has a plane perpendicular to the light incident direction.

In an embodiment, the lens driving module further includes a rolling element movably connected to the holder and the base.

In an embodiment, the lens driving module further includes two recesses respectively formed on the base and the holder, and accommodated the rolling element.

In an embodiment, the recesses have elongated structures respectively extending along the first direction and second direction, wherein the first direction is substantially perpendicular to the second direction.

In an embodiment, the lens driving module further includes an elastic element movably connected to the holder and the base.

In an embodiment, the holder has a C-shaped structure, and two ends of the C-shaped structure respectively have an angle plane inclining corresponding to the light incident direction.

In an embodiment, three separated contact regions are formed between the holder and the optical lens.

In an embodiment, the lens driving module further includes a circuit board having an opening, wherein the base has a recessed structure received the opening.

In an embodiment, the lens driving module further includes a plurality of circuit boards connected to the base and separated from each other, wherein a portion of the holder is received a space between the plurality of circuit boards.

In an embodiment, the lens driving module further includes a conductor embedded in the base and electrically connected to the plurality of circuit boards.

Some embodiments of the disclosure provide a lens driving module, including: a reflecting element, a base, a frame, a holder, an optical lens, a first electromagnetic driving assembly, and a second electromagnetic driving assembly. The frame is connected to the base, and the holder holds the optical lens and movably connects to the base. The reflecting element reflects light from the outside along a light incident direction to an optical lens along a first direction, wherein the light incident direction is substantially perpendicular to the first direction. The first and second electromagnetic driving assemblies are configured to force the holder and the optical lens to move relative to the base, wherein the first electromagnetic driving assembly has a first drive coil, the second electromagnetic driving assembly has a second drive coil, the first drive coil and the second drive coil have elongated structures extending in a second direction and the first direction respectively, and the first direction is substantially perpendicular to the second direction.

In an embodiment, the first electromagnetic driving assembly and the second electromagnetic driving assembly are situated in different heights in the light incident direction. As viewed along the light incident direction, the first electromagnetic driving assembly and the second electromagnetic driving assembly partially overlap.

In an embodiment, the lens driving module further includes a first aligning element and a second aligning element. The first aligning element is disposed on a top surface of the base, and the second aligning element is disposed on a bottom surface of the holder.

In an embodiment, the first aligning element is a permanent magnet, and the second aligning element is a Hall effect sensor. In an embodiment, the first aligning element is a Hall effect sensor, and the second aligning element is a permanent magnet.

Some embodiments of the disclosure provide a lens driving module, including: a reflecting element, a base, a frame, a holder, an optical lens, a first electromagnetic driving assembly, a second electromagnetic driving assembly, and a rolling element. The frame is connected to the base. The holder holds the optical lens and is movably connected to the base. Two recesses respectively formed on the base and the holder, and the rolling element is received in the recess. The reflecting element reflects light from the outside along a light incident direction to pass through the optical lens along a first direction, wherein the light incident direction is substantially perpendicular to the first direction. The first and second electromagnetic driving assemblies are configured to force the holder and the optical lens to move relative to the base, wherein the first and second electromagnetic driving assemblies are situated in different positions in the light incident direction. The rolling element is movably connected to the holder and the base.

Some embodiments of the disclosure provide an optical member driving mechanism, including: a movable portion, a fixed portion, a driving assembly, and a guiding assembly. The movable portion is configured to connect an optical lens with an optical axis. The fixed portion includes a base, wherein the base has a base surface. The movable portion is movable relative to the fixed portion, and the base surface faces the movable portion and is parallel to the optical axis. The driving assembly is configured to force the movable portion to move relative to the fixed portion. The movable portion is movable relative to the fixed portion via the guiding assembly. When viewed in a first direction that is perpendicular to the base surface, the optical axis does not overlap the driving assembly, and the optical axis does not overlap the guiding assembly.

Some embodiments of the disclosure provide a lens driving module, including: a base, a frame fixedly connected to the base, and a holder configured to connect an optical lens. The holder is movable relative to the base. The lens driving module also includes a reflecting element configured to reflect light from a light incident direction to a first direction. The first direction is perpendicular to the light incident direction, and the first direction is parallel to an optical axis of the optical lens. The lens driving module further includes a first electromagnetic driving assembly configured to force the holder to move along the first direction relative to the base. The lens driving module has multiple recesses formed on the base and arranged along the first direction. The lens driving module includes multiple the rolling elements disposed on the recesses, and the holder is moved relative to the base via the rolling elements.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The lens driving modules of some embodiments of the present disclosure are described in the following description. However, it should be appreciated that in the following detailed description of some embodiments of the disclosure provides various invention concepts which may be performed in widely various specific background. The specific embodiments disclosed are provided merely to clearly describe the invention in some specific methods without limiting the scope of the invention.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
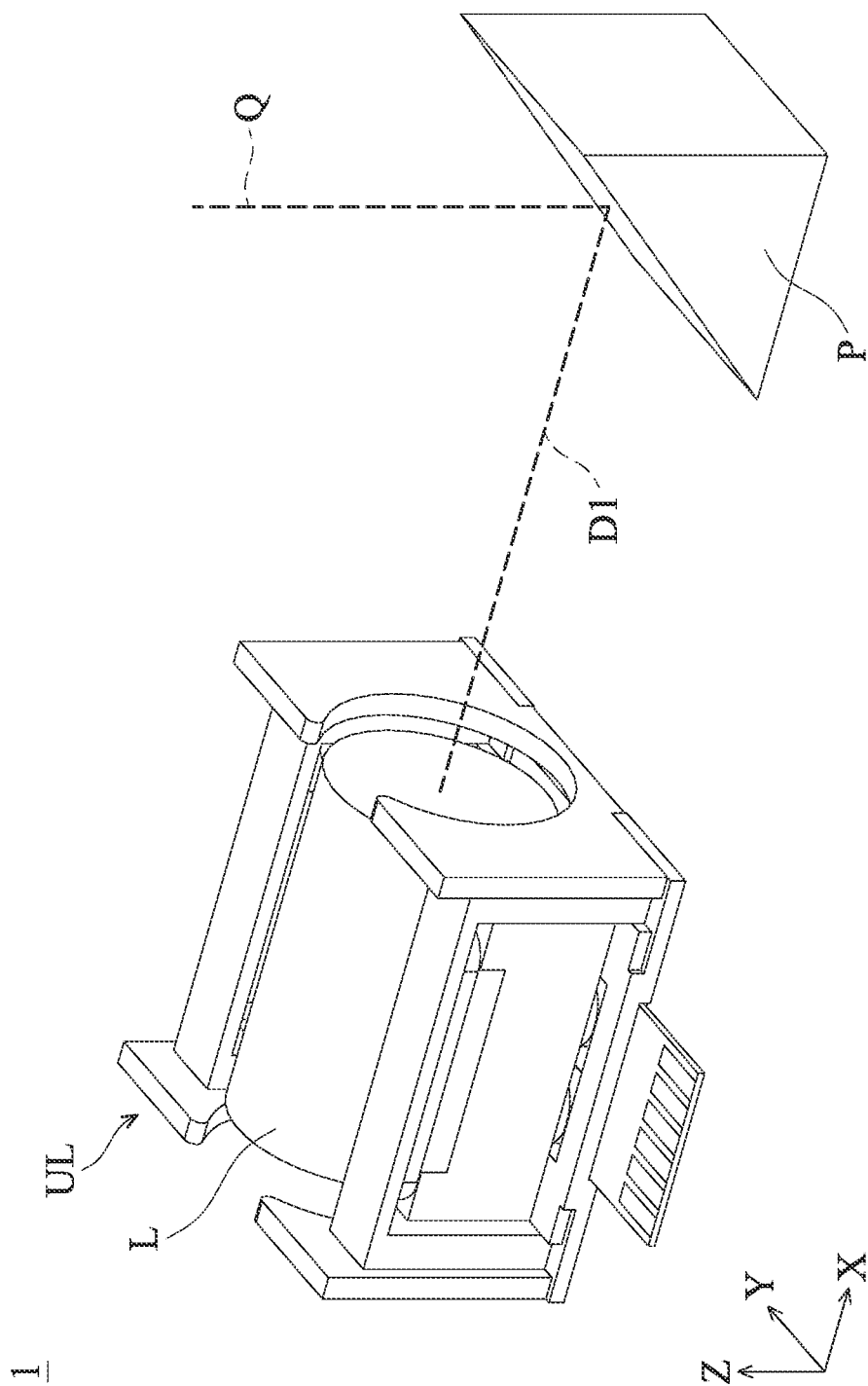
FIG. 1 is a schematic perspective view illustrating a lens driving module in an embodiment of the present disclosure.

FIG. 1 is a schematic perspective view illustrating a lens driving module 1 in an embodiment of the present disclosure. The lens driving module 1 may be disposed inside an electronic device (for example, a camera, a tablet computer, or a cell phone). The lens driving module 1 includes a lens unit UL and a reflecting element P. When a light from outside along a light incident direction Q (Z-axis) enter the lens driving module 1, the light is reflected from the light incident direction Q to pass through an optical lens L of the lens unit UL along a first direction D1 (X-axis) by the reflecting element P (for example, a prism or a reflecting mirror) of the lens driving module 1. Therefore, the light may pass through the optical lens L to a photosensitive element (not shown) in the electronic device in order to capture images.

It should be noted that an optical axis (substantially parallel to X-axis) of the optical lens L is substantially perpendicular to the light incident direction Q. Therefore, each element of the lens unit UL may be disposed along a direction parallel to X-axis, and the thickness of the electronic device in Z-axis direction may be significantly reduced to achieve miniaturization.

The optical lens L of the lens unit UL may move corresponding to the photosensitive element of the electronic device. Therefore, a focal distance of the optical lens L may be properly adjusted to achieve efficacy of auto-focusing (AF). Thus, image quality may be increased. The structure of the lens driving unit UL is described in detail as follows.

Figure 2:
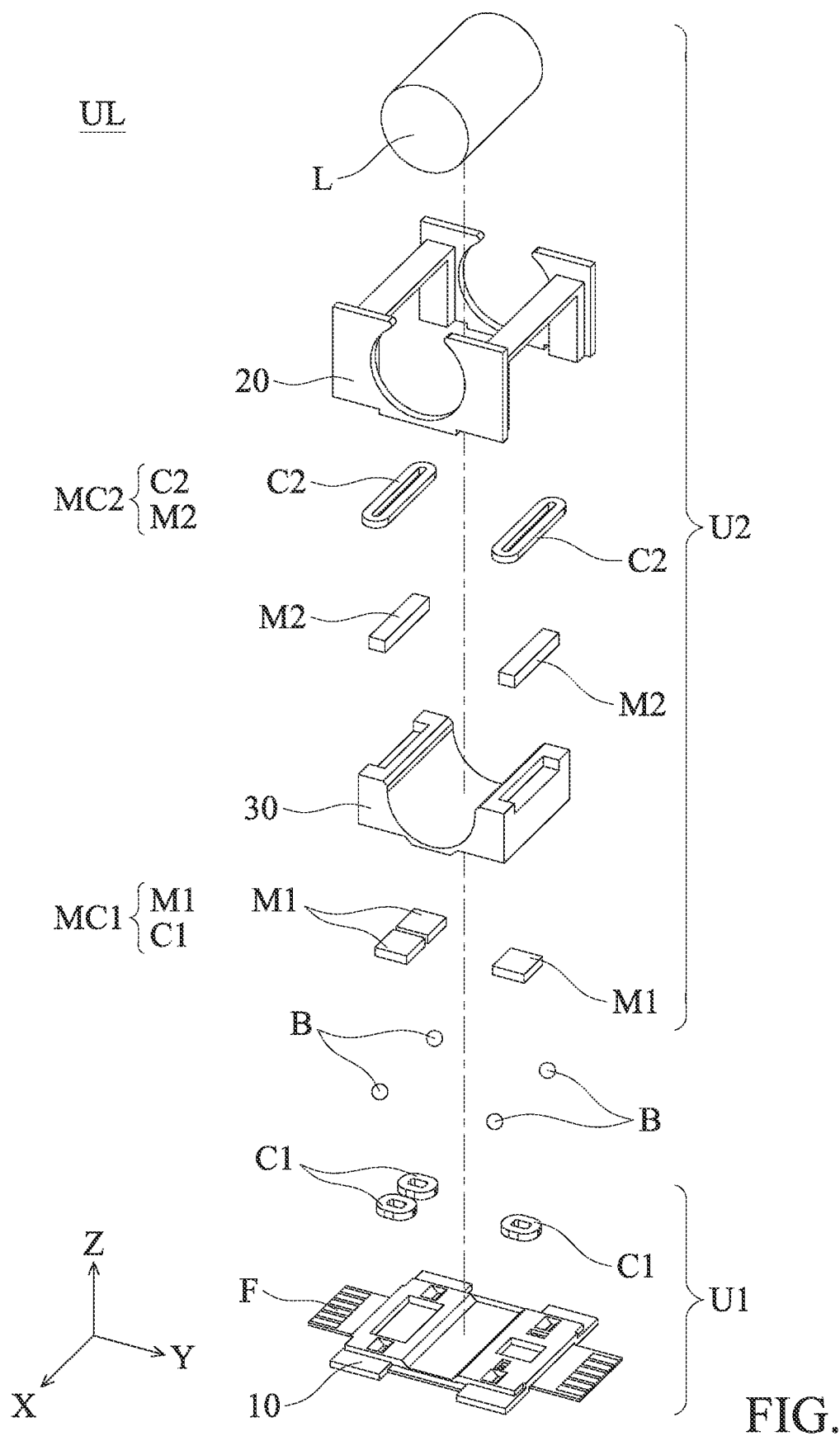
FIG. 2 is an explosion diagram illustrating a lens unit of the lens driving module in FIG. 1.
Figure 3:
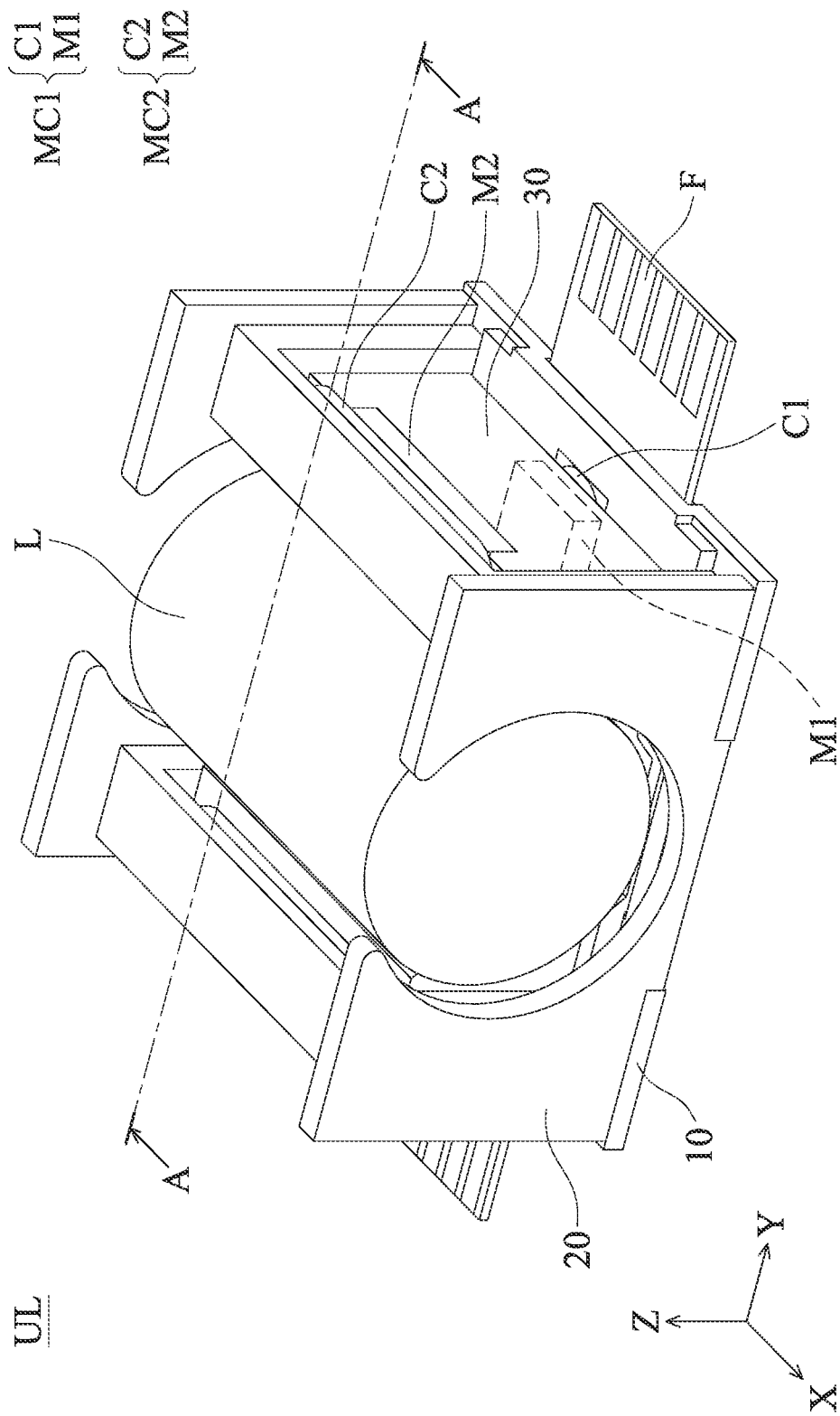
FIG. 3 is a schematic perspective view illustrating the lens unit in FIG. 2 after assembly.

Referring to FIGS. 2 and 3, FIG. 2 is an explosion diagram illustrating the lens unit UL in FIG. 1, and FIG. 3 is a schematic perspective view illustrating the lens unit UL in FIG. 2 after assembly. The lens unit UL includes a first unit U1, a second unit U2, and a plurality of rolling elements B (connecting pieces), wherein the rolling elements B are connected to the first and second units U1 and U2. The first and second units U1 and U2 mainly include: a base 10, a circuit board F, a frame 20, a holder 30, a first electromagnetic driving assembly MC1, a second electromagnetic driving assembly MC2, and an optical lens L. The frame 20 is disposed over the base 10 and fixed with each other. The holder 30 is also disposed over the base 10 and connected to each other by the rolling elements B in order to hold the optical lens L. As shown in FIGS. 2-3, the first electromagnetic driving assembly MC1 includes a plurality of first drive coils C1 and a plurality of first magnetic elements M1 (for example, magnets) respectively disposed on the base 10 and the holder 30, wherein a driving signal (for example, a current) may be applied to the first drive coil C1 by an external power source in order to force the holder 30 and the optical lens L to move relative to the frame 20 and the base 10. In addition, the second electromagnetic driving assembly MC2 includes a plurality of second drive coil C2 and a plurality of second magnetic elements M2 (for example, magnets) respectively disposed on the frame 20 and the holder 30, wherein a driving signal may be applied to the second drive coil C2 by an external power source in order to force the holder 30 and the optical lens L to move relative to the frame 20 and the base 10. By forcing the optical lens L to move relative to the frame 20 and the base 10 through the first and second electromagnetic driving assemblies MC1 and MC2, the efficacy of optical image stabilization (OIS) may be achieved.

Figure 4:
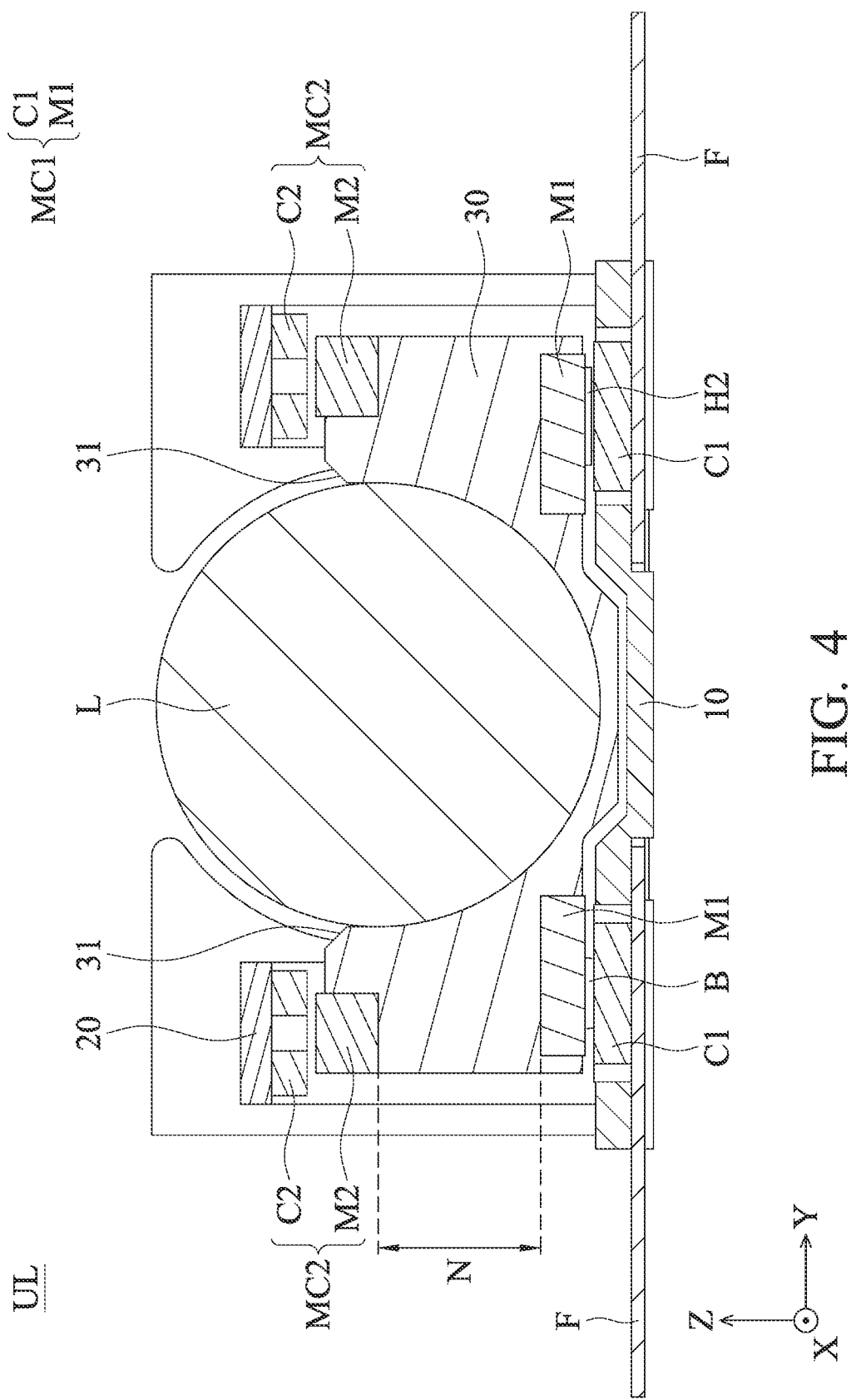
FIG. 4 is a cross-sectional view of the lens unit along the line A-A in FIG. 3.

Referring to FIGS. 3-4, the structures of the first and second electromagnetic driving assemblies MC1 and MC2 are shown in detail, wherein FIG. 4 is a cross-sectional view along the line A-A in FIG. 3. The first and second electromagnetic driving assemblies MC1 and MC2 are respectively disposed (or embedded) on the bottom and top surfaces of the holder 30. The first and second drive coils C1 and C2 are respectively disposed on the base 10 and the frame 20. The first and second magnetic elements M1 and M2 are correspondingly placed facing the first and second drive coils C1 and C2 in order to form the first and second electromagnetic driving assemblies MC1 and MC2 capable of forcing the holder 30 and the optical lens L to move. In the embodiments, at least each one of the first and second electromagnetic driving assemblies MC1 and MC2 are disposed on the left and right sides of the optical lens L (shown in FIG. 4), so that the holder 30 and the optical lens L can stably move relative to the base 10 and the frame 20.

It should be appreciated that the configurations and positions of the first drive coil C1, the first magnetic element M1, the second drive coil C2, and the second magnetic element M2 are not limited to the aforementioned embodiments. For example, in some other embodiments, the first and second magnetic elements M1 and M2 may respectively be disposed on the base 10 and the frame 20, and the first and second drive coils C1 and C2 may be disposed on the holder 30.

In addition, as shown in FIG. 4, the holder 30 has a C-shaped structure, and the two ends of the C-shaped structure respectively has an angled plane 31 (inclining relative to Z-axis). The angled planes 31 may be conducive to assembling, connecting or attaching the holder 30 and other elements.

The moving mode of the optical lens L is described in detail as follows. When an appropriate driving signal is applied to the first electromagnetic driving assembly MC1, the first electromagnetic driving assembly MC1 can force the holder 30 and the optical lens L to move along the first direction D1 (substantially parallel to X-axis) relative to the base 10 and the frame 20. Similarly, when an appropriate driving signal is applied to the second electromagnetic driving assembly MC2, the second electromagnetic driving assembly MC2 can force the holder 30 and the optical lens L to move in the second direction D2 (substantially parallel to Y-axis) relative to the base 10 and the frame 20. Accordingly, the holder 30 and the optical lens L may move towards two different directions, the first and second directions D1 and D2, on the xy-plane. Therefore, the lens driving module 1 can have the better efficacy of vibration compensation. Furthermore, in the Z-axis direction (the light incident direction Q), by placing the first and second electromagnetic driving assemblies MC1 and MC2 at different heights, the problem of electromagnetic interference due to being on the same plane may be reduced or avoided. Moreover, the magnetic driving forces generated by the first and second electromagnetic driving assemblies MC1 and MC2 in the lens unit UL for driving the optical lens L can be effectively increased. In addition, because a distance N between the first and second electromagnetic driving assemblies MC1 and MC2 in Z-axis direction is shorter than a diameter of the optical lens L, the height of the lens unit UL in Z-axis direction may be reduced. Thus, the overall volume of the lens driving module may be reduced.

Figure 5:
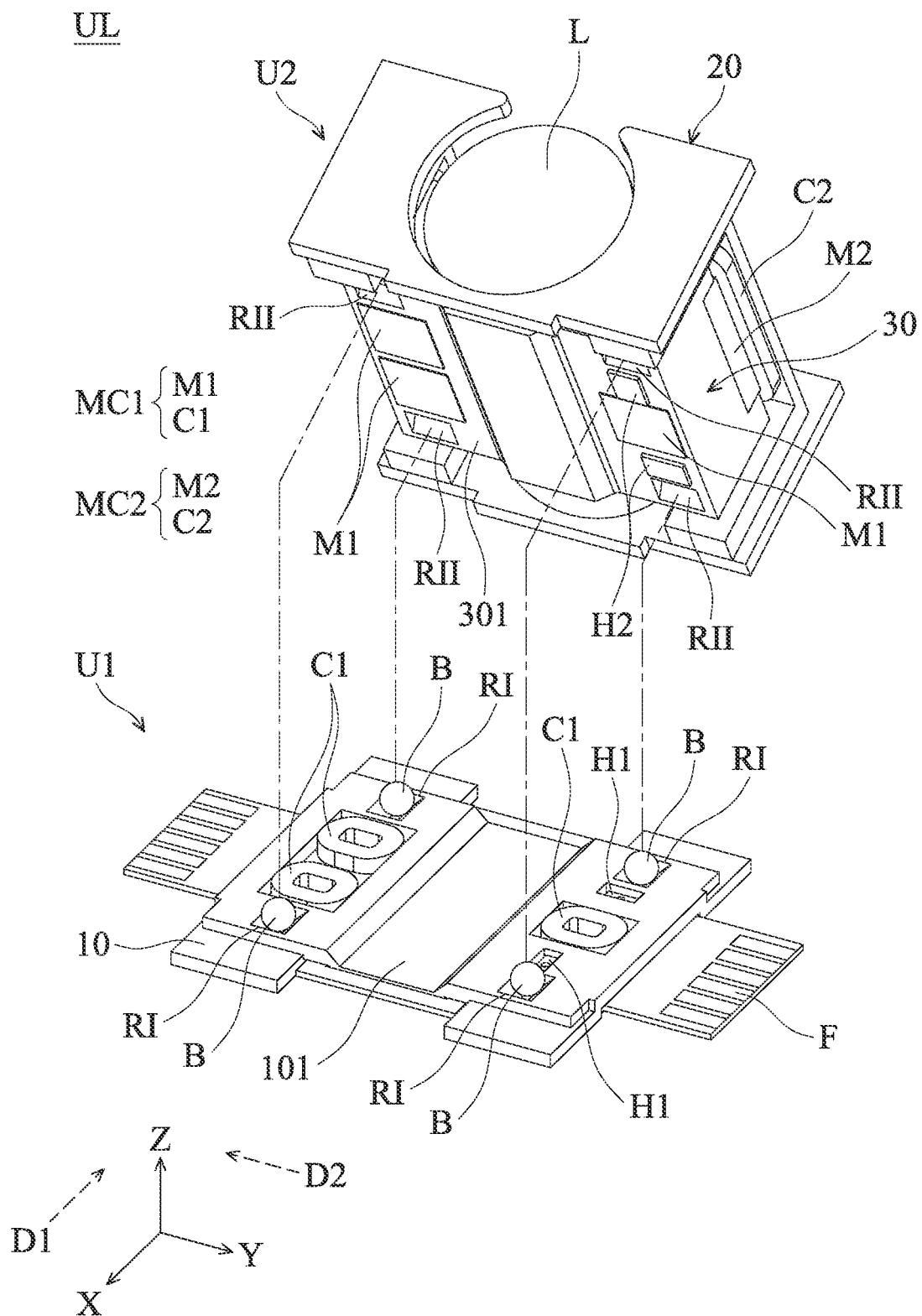
FIG. 5 is a schematic perspective view illustrating a first unit U1, a second unit U2, and a rolling element B.

As shown in FIG. 5, it should be noted that a plurality of recesses RI are formed on the top surface of the base 10, and a plurality of recesses RII are formed on the bottom surface 301 of the holder 30. The plurality of recesses RI and RII correspondingly accommodate a portion of the plurality of the rolling elements B and may be used to lead the rolling elements B to roll. In the embodiment, the recesses RI and RII have elongated structures. Macro-axes of the recesses RI extend in the first direction D1 (substantially parallel to X-axis), and macro-axes of the recesses RII extend in the second direction D2 (substantially parallel to Y-axis), wherein the first direction D1 is substantially perpendicular to the second direction D2. Accordingly, the rolling elements B can successfully roll along the first and second directions D1 and D2 on the xy-plane to lead the optical lens L and the holder 30 to move in the first and second directions D1 and D2 relative to the base 10 and the frame 20. Therefore, the lens unit UL may have the efficacy of vibration compensation in at least two dimensions. In addition, the first drive coil C1 and the second drive coil C2 also have elongated structures extending towards the second and first directions D2 and D1, respectively.

Referring to FIGS. 4 and 5, the lens unit UL further includes two pairs of first and second aligning elements H1 and H2. The first and second aligning elements H1 and H2 are respectively disposed on the top surface of the base 10 and the bottom surface 301 of the holder 30. In some embodiments, the first aligning element H1 may be one of a permanent magnet and a Hall effect sensor, and the second aligning element H2 is another one of the two aforementioned. The Hall effect sensor can determine the position of the permanent magnet by detecting the change of the magnetic field of the permanent magnet. In this way, the position deviation of the holder 30 and the optical lens L caused by vibration may be detected and compensated for.

Figure 6:
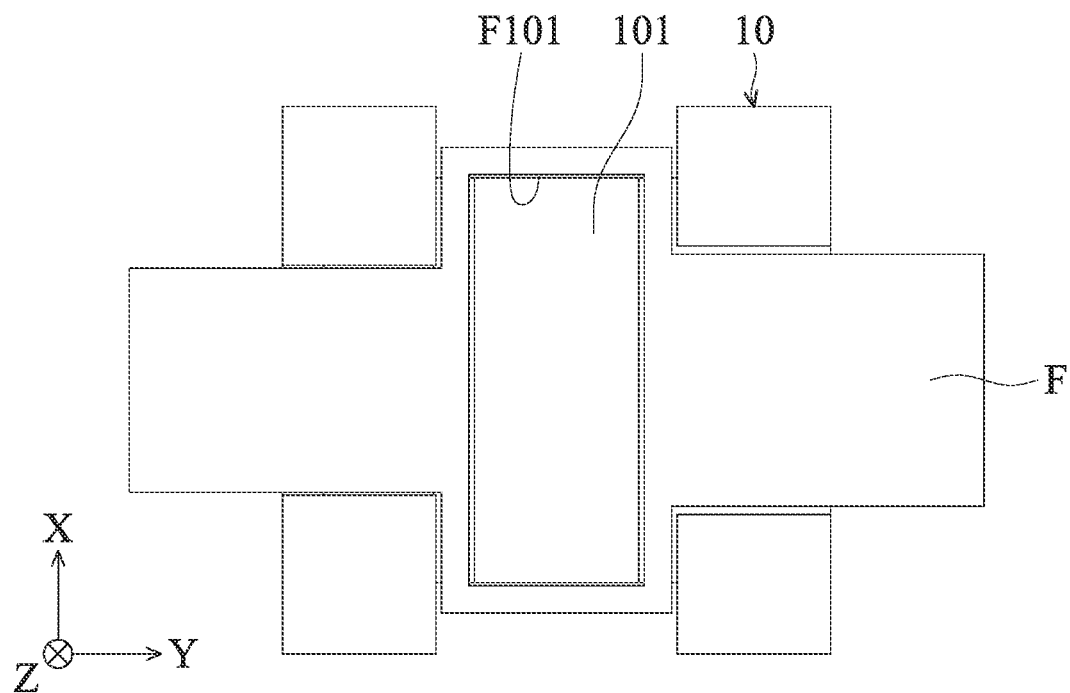
FIG. 6 is a bottom view illustrating a base and a circuit board in FIG. 5.

Referring to FIGS. 5 and 6, FIG. 6 is a bottom view illustrating the base 10 and the circuit board F. The circuit board F is connected to the base 10, and an opening F101 is formed in the circuit board F. A recessed structure 101 (shown in FIG. 5) is formed on the top surface of the base 10. The recessed structure 101 is embedded in the opening F101. Accordingly, when assembling the first and second units U1 and U2, the thickness of the circuit board F in Z-axis (the light incident direction Q) may be reduced to effectively save space.

Figure 7:
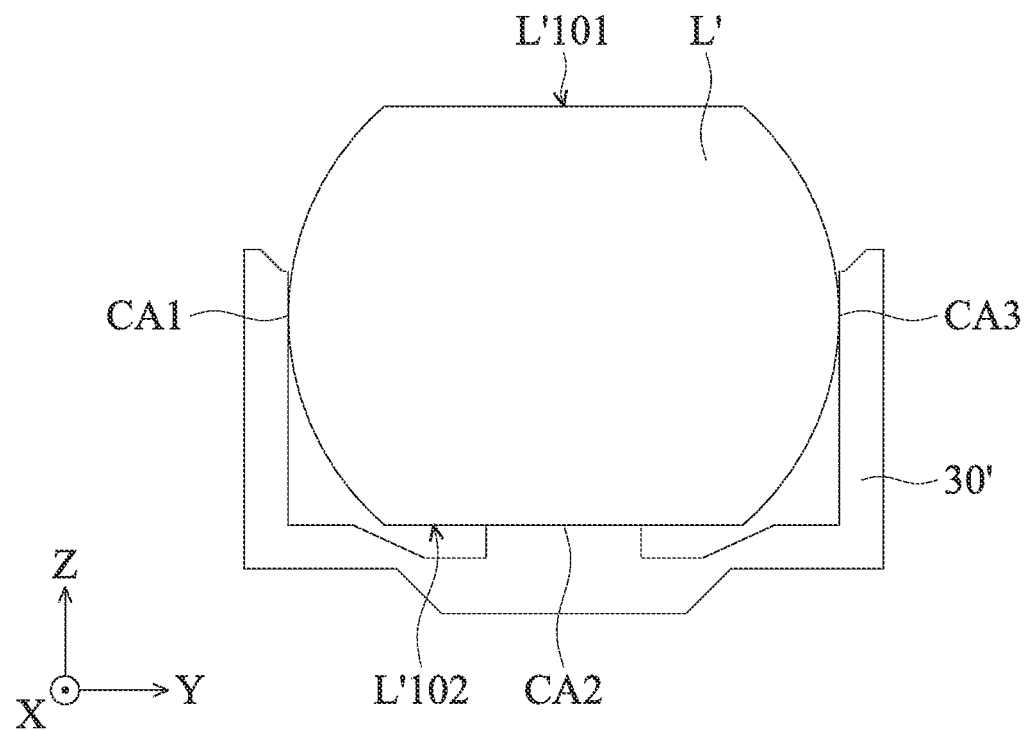
FIG. 7 is a schematic diagram illustrating an optical lens and a holder in another embodiment of the disclosure.

FIG. 7 is a schematic diagram illustrating an optical lens L' and a holder 30' in another embodiment of the disclosure. As shown in the figure, the difference between the optical lens L' and the optical lens L in FIG. 2 is that the optical lens L' has two planes L'101 and L'102 that are substantially perpendicular to Z-axis (the light incident direction Q). In comparison with the optical lens L, the optical lens L' has a thinner thickness in Z-axis direction. Thus, the volume of the lens unit can be reduced. Furthermore, the holder 30' and the optical lens L' only have three contact regions CA1, CA2, and CA3 separated from each other. In this way, the contact area between the optical lens L' and the holder 30' can be reduced in order to increase the precision and convenience of assembly.

Figure 8:
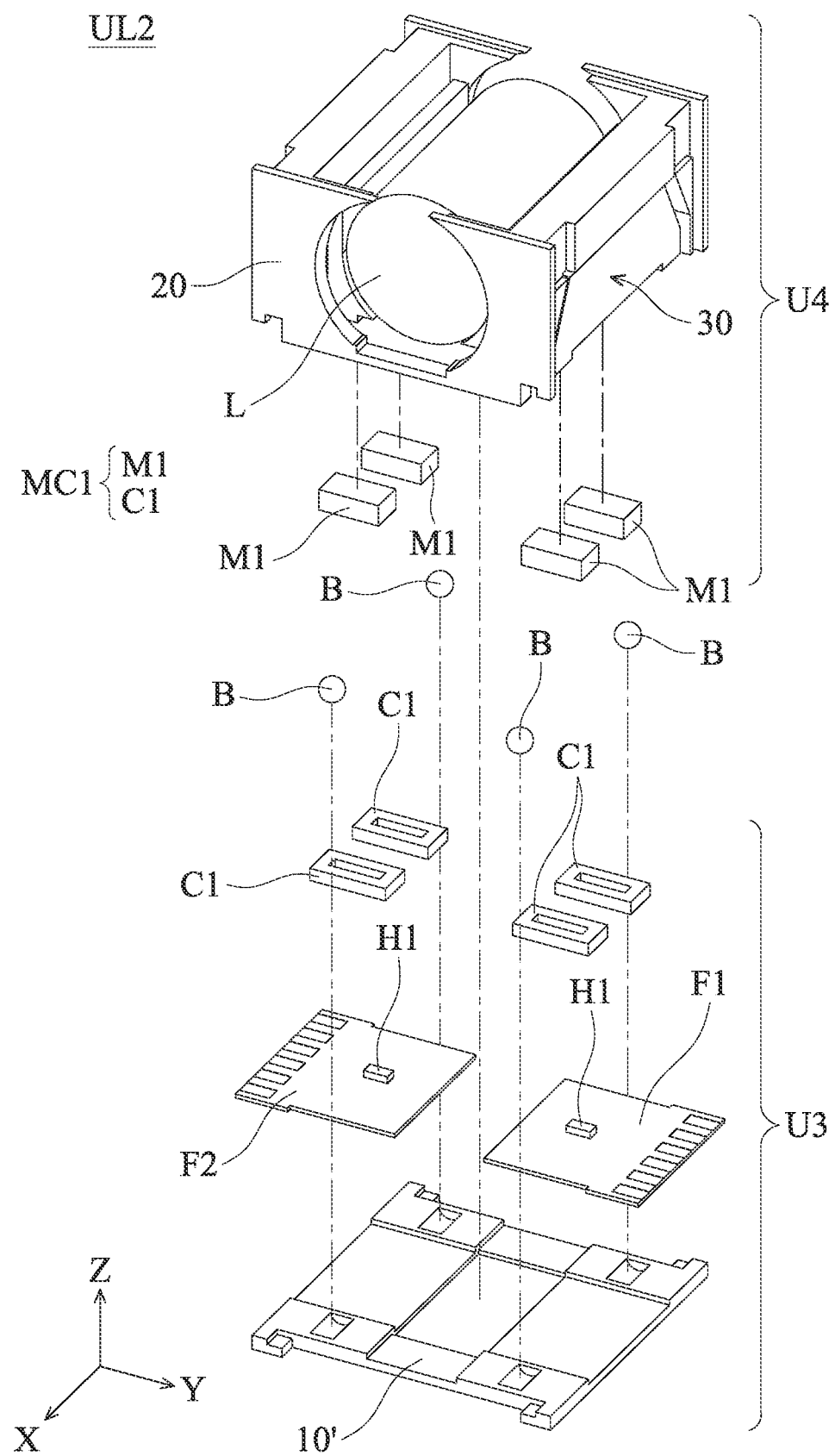
FIG. 8 is an explosion diagram illustrating a lens unit in another embodiment of the disclosure.
Figure 9:
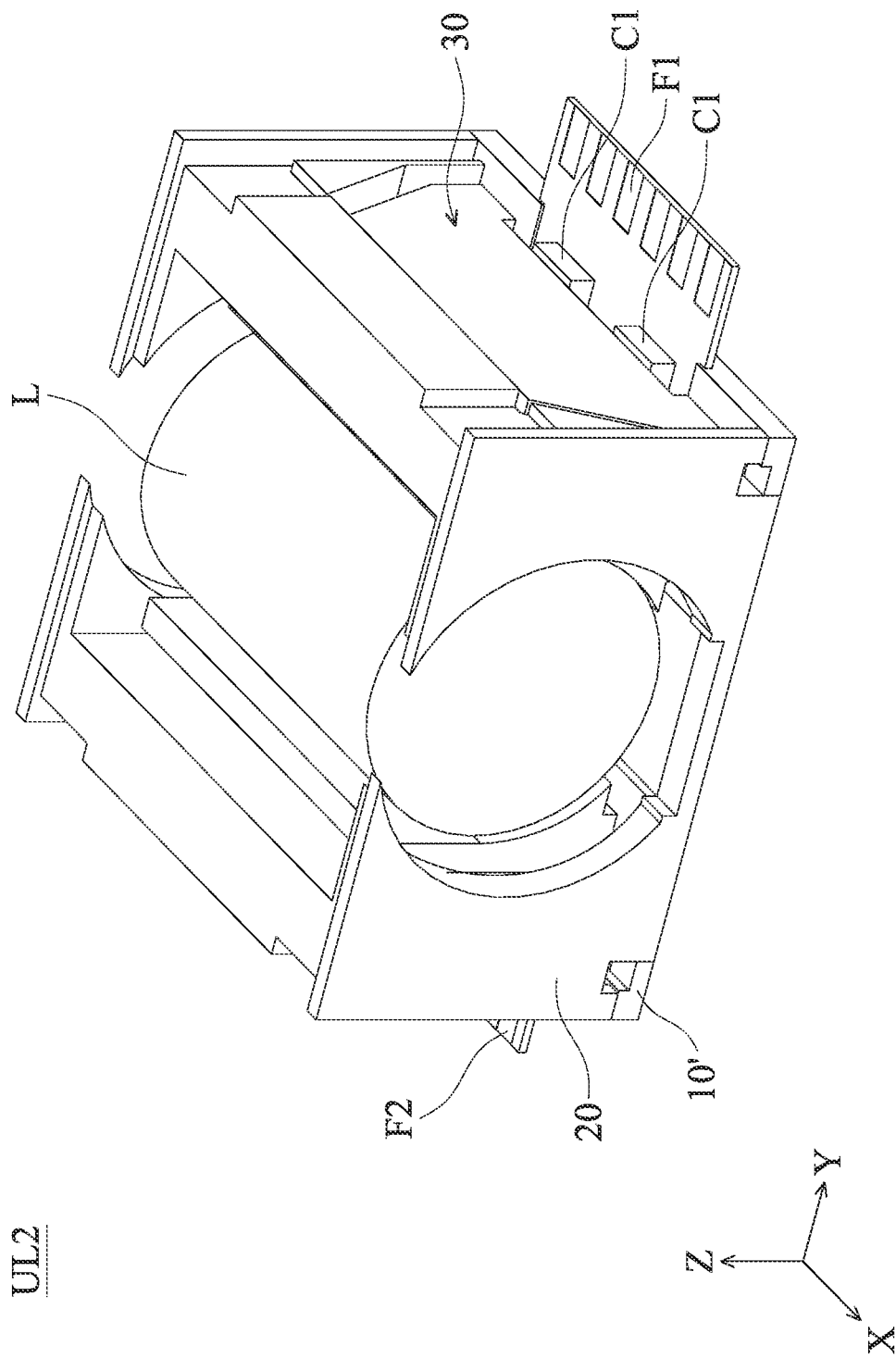
FIG. 9 is a schematic perspective view illustrating the lens unit in FIG. 8 after assembly.
Figure 10:
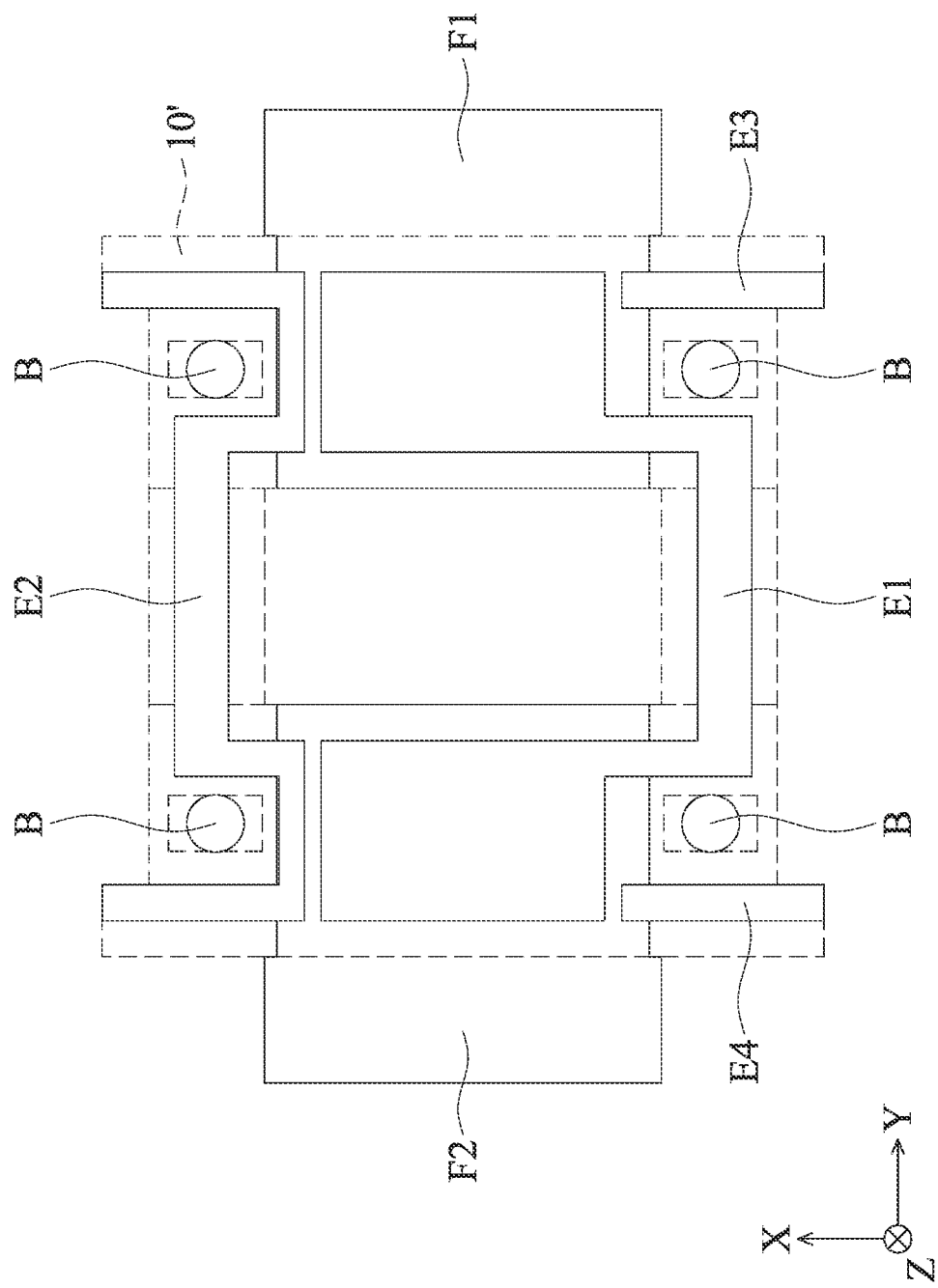
FIG. 10 is a bottom view illustrating a base 10', circuit boards F1 and F2, and a rolling element B in FIG. 8 after assembly.

FIGS. 8 to 10 are schematic diagrams of a lens unit UL2 in another embodiment of the present disclosure. The lens unit UL2 includes a first unit U3, a second unit U4, and a plurality of rolling elements B. The second unit U4 is disposed over the first unit U3 and connected to the first unit U3 through the rolling elements B. The second unit U4 includes four first magnetic elements M1, and the other elements of the second unit U4 are the same or corresponding to those of the aforementioned second unit U2 (shown in FIG. 2). There is just a slight difference in appearance. Therefore, the other elements of the second unit U4 are not described in detail here again.

As shown in FIGS. 8 and 9, the main difference between the first unit U3 in this embodiment and the aforementioned first unit U1 (shown in FIG. 2) is that the first unit U3 includes four first drive coils C1 and two separated circuit boards F1 and F2, wherein the first drive coils C1 and the circuit boards F1 and F2 are disposed over the base 10' in the manner of substantially symmetrical to a central axis (Z-axis direction) of the lens unit UL2. The circuit boards F1 and F2 are respectively connected to two of the first drive coils C1. The four first magnetic elements M1 are correspondingly placed facing the first drive coils C1 in order to form the first electromagnetic driving assembly MC1. Thus, the holder 30 and the optical lens L may be forced to move relative to the base 10' and the frame 20.

FIG. 10 is a bottom view of the base 10', the circuit boards F1 and F2, and the rolling elements B in FIG. 8 after assembly, wherein the base 10' is illustrated by dotted lines in order to show that it is a perspective element. A plurality of conductors (such as metal sheets) E1-E4 are embedded in the base 10' by the methods, for example, insert molding or a 3D molded interconnect device technique. The conductors E1-E4 are electrically connected to the circuit boards F1 and F2. An external power source applies driving signals to the circuit boards F1 and F2 and the first drive coil C1 through the conductor E1-E4 in order to force the optical lens L to move by the electromagnetic driving assembly MC1. As shown in FIG. 8, it should be noted that the two separated circuit boards F1 and F2 are respectively disposed on the left and right sides of the optical lens L and are separated by a distance. Therefore, after assembling the first and second units U3 and U4, a portion of the bottom of the holder 30" is accommodated between a space between the circuit boards F1 and F2. Thus, the overall thickness of the lens unit UL2 in Z-axis direction can be reduced in order to save space.

Figure 11:
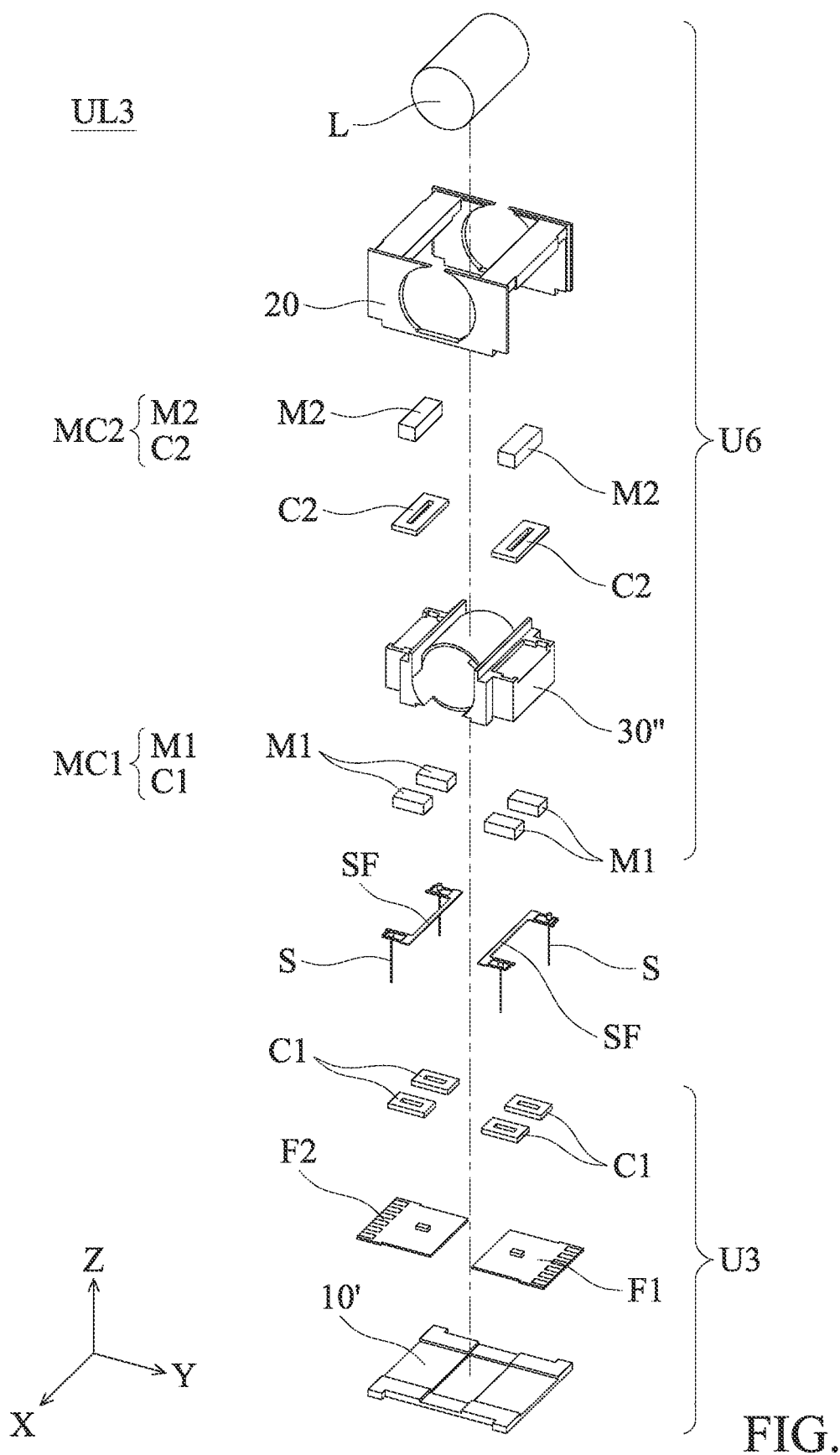
FIG. 11 is an explosion diagram illustrating a lens unit in another embodiment of the disclosure.
Figure 12:
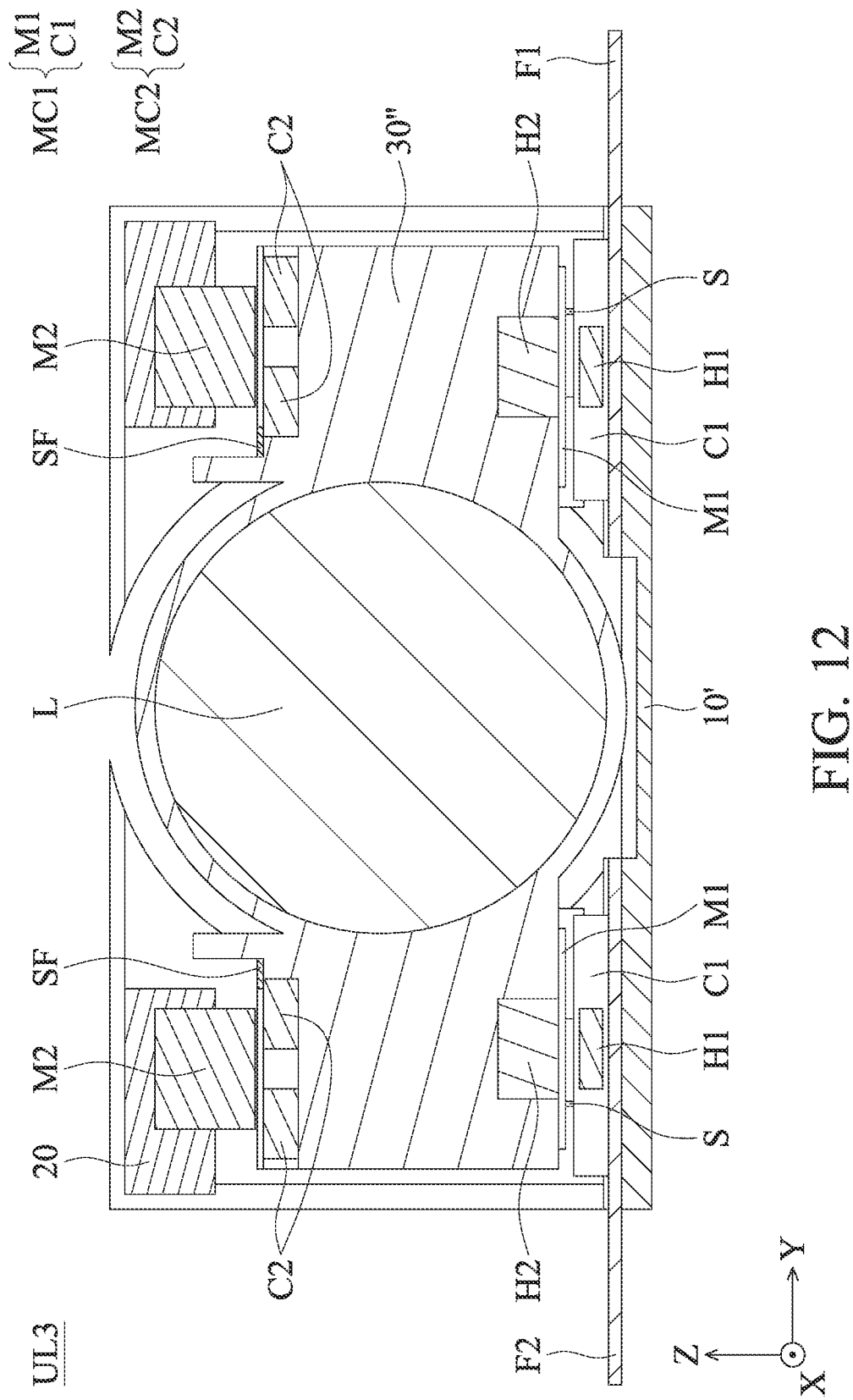
FIG. 12 is a cross-sectional view illustrating the lens unit in FIG. 11 after assembly.

FIG. 11 is an exploded diagram illustrating a lens unit UL3 in another embodiment of the present disclosure. FIG. 12 is a cross-sectional view of the lens unit UL3. As shown in FIGS. 11 and 12, the main difference between the lens unit UL3 in the embodiment and the aforementioned lens unit UL2 (shown in FIG. 8) is that the shape of a holder 30" in a first unit U6 of the lens unit UL3 is different from that of the aforementioned holder 30. The lens unit UL3 includes a plurality of leaf springs SF and a plurality of elastic elements S (connection pieces), wherein the leaf springs SF are disposed on the top surface of the holder 30", and the two ends of each of the elastic elements S are respectively connected to the leaf springs SF and the base 10'. Thus, the holder 30" and the optical lens L are movably connected to the base 10'. Moreover, the second magnetic elements M2 are disposed over the frame 20, and the second drive coils C2 are disposed on the top surface of the holder 30" and connected to the leaf springs SF (shown in FIG. 12).

The holder 30" has a substantially circular hollow structure which can be used to stably hold the optical lens L. Four elastic elements S (for example, flexible metal wires) are respectively disposed at the corners of the leaf spring SF (for example, a metal-containing sheet spring) to connect the holder 30" and the base 10'. The holder 30" and the optical lens L may move relative to the base 10' through the electromagnetic driving assemblies MC1 (including the magnetic elements M1 and the drive coils C1) and MC2 (including the magnetic elements M2 and the drive coils C2) in order to achieve the functions of auto-focusing (AF) and optical image stabilization (OIS).

In summary, the embodiments provide a lens driving module which may be disposed in an electronic device. The lens driving module includes a lens unit, a reflecting element, and at least one connecting piece, wherein the lens unit includes an optical lens, a holder, a frame, a base, a first electromagnetic driving assembly, and a second electromagnetic driving assembly. The reflecting element is used for reflecting light from the outside to pass through the lens unit to a photosensitive element in the electronic device in order to capture images. The frame is fixed on the base. The connecting piece may be a rolling element or a flexible elastic element which is connected to the holder and the base. The first electromagnetic driving assembly is disposed on the base and the holder. The second electromagnetic driving assembly is disposed on the frame and the holder. The first and second electromagnetic driving assemblies force the holder and the optical lens to move relative to the base and the frame. The first and second electromagnetic driving assemblies are situated at different positions in a light incident direction such that the interference between two electromagnetic driving assemblies in the lens unit may be reduced. The magnetic driving force can be thereby effectively increased. Moreover, the holder and the optical lens may be led to move relative to the base and the frame along a plurality of directions that are perpendicular to the light incident direction in order to achieve good optical focusing or compensation. Furthermore, by not overlapping the optical lens with the circuit boards in the base, the overall volume of the lens driving module can be reduced.

It should be understood that there is no relationship in a sequence between the ordinal numbers in the present specification and claims, such as "first", "second" etc. These terms are only used to distinguish two different elements with the same name.

The aforementioned embodiments are adequately described in detail for those skilled in the art to perform the device of the present disclosure. It should be understood that those skilled in the art may make various changes and modifications to the invention without departing from the spirit and scope of the present disclosure. Therefore, the scope of the present disclosure is defined according to the following claims.

What is claimed is:

1. A lens driving module, comprising:
   a base;
   a frame fixedly connected to the base;
   a holder configured to connect an optical lens, wherein the holder is movable relative to the base;
   a reflecting element configured to reflect light from a light incident direction to a first direction, wherein the first direction is perpendicular to the light incident direction, and the first direction is parallel to an optical axis of the optical lens;
   a first electromagnetic driving assembly configured to force the holder to move along the first direction relative to the base;
   a plurality of recesses formed on the base and arranged along the first direction, wherein the recesses are formed on a top surface of the base, the top surface is parallel to the optical axis, and each of the recesses has an elongated structure extending along a direction that is parallel to the optical axis; and
   a plurality of the rolling elements disposed on the recesses, wherein the holder is moved relative to the base via the rolling elements.

2. The lens driving module as claimed in claim 1, wherein when viewed along the direction that is parallel to the optical axis, a size of the optical lens in the light incident direction is smaller than a size of the optical lens in a second direction, and the second direction, the light incident direction, and the optical axis are perpendicular to each other.

3. The lens driving module as claimed in claim 2, wherein the first electromagnetic driving assembly comprises two first magnetic elements respectively disposed on the left side and the right side of the optical lens.

4. The lens driving module as claimed in claim 3, wherein when viewed along the direction that is parallel to the optical axis, the first magnetic elements are arranged in a direction that is parallel to the second direction.

5. The lens driving module as claimed in claim 4, wherein the top surface is parallel to the second direction.

6. The lens driving module as claimed in claim 5, further comprising a first circuit board and a second circuit board, and the first electromagnetic driving assembly further comprises two first drive coils, wherein the first drive coils are respectively electrically connected to the first circuit board and the second circuit board.

7. The lens driving module as claimed in claim 6, wherein a part of the holder is located between the first circuit board and the second circuit board.

8. The lens driving module as claimed in claim 6, wherein when viewed along a direction that is perpendicular to the optical axis, the holder, the rolling elements, the first circuit board and the second circuit board at least partially overlap.

* * * * *